(12) United States Patent
Yu et al.

(10) Patent No.: US 11,949,286 B2
(45) Date of Patent: Apr. 2, 2024

(54) ELECTRIC MOTOR AND STATOR OF ELECTRIC MOTOR HAVING POSITIONING GROOVES

(71) Applicant: Ningbo Gloyel Electric Motor Co. Ltd., Ningbo (CN)

(72) Inventors: Chuang Yu, Zhejiang (CN); Yongbin Li, Zhejiang (CN); Guixin Huang, Zhejiang (CN)

(73) Assignee: NINGBO GLOYEL ELECTRIC MOTOR CO. LTD., Ningbo (CN)

( * ) Notice: Subject to any disclaimer, the term of this patent is extended or adjusted under 35 U.S.C. 154(b) by 230 days.

(21) Appl. No.: 17/547,279

(22) Filed: Dec. 10, 2021

(65) Prior Publication Data
US 2022/0247243 A1   Aug. 4, 2022

(30) Foreign Application Priority Data
Feb. 1, 2021   (CN) .......................... 202110136837.9

(51) Int. Cl.
| | |
|---|---|
| H02K 1/16 | (2006.01) |
| H02K 1/18 | (2006.01) |
| H02K 5/15 | (2006.01) |
| H02K 5/16 | (2006.01) |

(52) U.S. Cl.
CPC ............... *H02K 1/165* (2013.01); *H02K 1/18* (2013.01); *H02K 5/15* (2013.01); *H02K 5/16* (2013.01)

(58) Field of Classification Search
CPC ............ H02K 1/16; H02K 1/165; H02K 5/15; H02K 5/16

USPC ....................................................... 310/40 R
See application file for complete search history.

(56) References Cited

U.S. PATENT DOCUMENTS

| | | | | |
|---|---|---|---|---|
| 6,348,753 | B1 * | 2/2002 | Sakai ...................... | H02K 1/148 |
| | | | | 310/40 MM |
| 6,472,780 | B2 * | 10/2002 | Kikuchi ................. | H02K 1/185 |
| | | | | 310/52 |
| 7,084,544 | B2 * | 8/2006 | Park ........................ | H02K 1/12 |
| | | | | 310/216.067 |
| 7,268,459 | B2 * | 9/2007 | Baba ...................... | H02K 1/185 |
| | | | | 310/216.067 |
| 9,680,359 | B2 * | 6/2017 | Hattori ................... | H02K 16/00 |
| 10,855,122 | B2 * | 12/2020 | Komori ................. | H02K 15/10 |
| 10,923,971 | B2 * | 2/2021 | Aso ........................ | H02K 15/02 |
| 11,081,926 | B2 * | 8/2021 | Horng ..................... | H02K 1/146 |
| 2004/0021393 | A1 * | 2/2004 | Suzuki ................... | H02K 1/148 |
| | | | | 310/216.012 |

(Continued)

*Primary Examiner* — Rashad H Johnson
(74) *Attorney, Agent, or Firm* — Andrew C. Cheng (57) ABSTRACT

An electric motor includes electric motor stator and a rotor rotatably inserted in the electric motor stator. The electric motor stator includes a stator iron core and an end cap. The end cap is formed, in an interior thereof, with a receiving space that receives the stator iron core therein. The stator iron core includes an annular stator yoke and a plurality of stator teeth extending radially from an internal circumferential surface of the stator yoke. The stator yoke has an external circumferential surface that is recessed to form positioning grooves. The end cap has an internal surface that is protruded to form positioning posts that are respectively insertable into and connectable with the positioning grooves. The positioning grooves respectively correspond to the stator teeth in a radial direction of the stator iron core.

16 Claims, 9 Drawing Sheets

(56) References Cited

U.S. PATENT DOCUMENTS

| | | | |
|---|---|---|---|
| 2008/0048517 A1* | 2/2008 | Ochiai | H02K 1/278 310/216.004 |
| 2009/0108700 A1* | 4/2009 | Sakuma | H02K 1/185 310/216.004 |
| 2009/0261677 A1* | 10/2009 | Ishikawa | H02K 1/278 29/598 |
| 2013/0169085 A1* | 7/2013 | Taema | H02K 3/28 310/71 |
| 2013/0221788 A1* | 8/2013 | Yokota | H02K 1/2791 310/181 |
| 2017/0117765 A1* | 4/2017 | Nishifukumoto | H02K 1/278 |
| 2017/0256995 A1* | 9/2017 | Lam | H02K 15/022 |
| 2019/0068009 A1* | 2/2019 | Nakahara | H02K 15/095 |
| 2021/0408849 A1* | 12/2021 | Egashira | H02K 15/024 |
| 2023/0253838 A1* | 8/2023 | Amaya | H02K 21/16 310/156.56 |

\* cited by examiner

ELECTRIC MOTOR AND STATOR OF ELECTRIC MOTOR HAVING POSITIONING GROOVES

FIELD OF THE INVENTION

The present invention relates to the field of electric motors, and more particularly to a stator of an electric motor.

DESCRIPTION OF THE RELATED ART

An electric motor is a commonly used power source which usually comprises a motor housing, a stator fixed in the motor housing, and a rotor rotatable relative to the stator. The stator comprises a winding, while the rotor includes a permanent magnet. The stator winding is supplied with an electricity to generate a varying magnetic field, which interacts with a magnetic field of the permanent magnet of the rotor to thereby drive the rotor to constantly rotate for driving a loading.

To ease the assembly of the electric motor, an external wall surface of the electric motor stator is often provided with slots, and an internal wall surface of the electric motor housing is provided with ribs. To mount the stator inside the electric motor housing, the ribs are inserted into and positioned by the slots, and subsequent assembling could thus be simplified. However, the arrangement of the slots makes a width of the stator in a radial direction narrowed down. This increases magnetic reluctance to some extents, and lowers the performance of the electric motor.

SUMMARY OF THE INVENTION

In view of the above, an electric motor stator that exhibits a small magnetic reluctance and excellent perform, and an electric motor using such an electric motor stator, are provided.

The present invention provides an electric motor stator, which comprises a stator iron core and an end cap, the end cap being formed, in an interior thereof, with a receiving space that receives the stator iron core therein, wherein the stator iron core comprises a stator yoke in an annular form and a plurality of stator teeth extending inwards in a radial direction from an internal circumferential surface of the stator yoke; the stator yoke has an external circumferential surface that is inwardly recessed to form at least one positioning groove, and the end cap has an internal surface that is outwardly protruded to form at least one positioning post; each of the at least one positioning post is insertable into and connectable with one of the at least one positioning groove; and in the radial direction of the stator iron core, each of the at least one positioning groove corresponds to one of the stator teeth.

Further, the at least one positioning groove comprises multiple positioning grooves, and the positioning grooves correspond, in number, to the stator teeth; and in the radial direction of the stator iron core, the positioning grooves correspond to the stator teeth in a one to one manner.

Further, the stator iron core comprises a plurality of first silicon steel laminations and a plurality of second silicon steel laminations, the first silicon steel laminations being received in the receiving space of the end cap, the second silicon steel laminations having an external circumferential surface that is outwardly protruded in the radial direction to form connecting parts, the connecting parts extending outside of the end cap; the positioning grooves comprise first positioning grooves and second positioning grooves, the first positioning grooves being formed in the external circumferential surface of the first silicon steel laminations and in alignment with the connecting parts in an axial direction, the second positioning grooves being formed in the external circumferential surface of the first silicon steel laminations and the second silicon steel laminations and being staggered with respect to the connecting parts in a circumferential direction.

Further, the end cap comprises a bottom plate and a side plate circumferentially surrounding the bottom plate, the at least one positioning post comprising multiple positioning posts that are formed in on an internal surface of the side plate, the positioning posts comprising first positioning posts and second positioning posts, the first positioning posts being insertable into and connectable with the first positioning grooves, the second positioning posts being insertable into and connectable with the second positioning grooves, the first positioning posts having an axial length that is less than an axial length of the second positioning posts.

Further, the side plate is formed with openings in an end thereof that is distant from the bottom plate, each of the openings being in alignment with one of the first positioning posts in the axial direction, the openings extending completely through the side plate in the radial direction; a portion of the second silicon steel laminations is located inside the end cap and a portion of the second silicon steel laminations is located outside the end cap, the connecting parts of the second silicon steel laminations extending through the openings to outside of the end cap.

Further, the side plate has an external surface that is protruded in a position corresponding to each of the openings to form a mounting portion, the mounting portions having an end surface that is not lower than a bottom surface of the openings, the connecting parts extending through the openings to stack on the mounting portions.

Further, the connecting parts are each formed with a connection hole, the mounting portions being each formed with a mounting hole, the connecting holes being in alignment with and in communication with the mounting holes.

Further, the bottom plate is formed, in a central portion thereof, with an axle hole, and the bottom plate is provided, on each of inner and outer sides thereof, with a bearing seat surrounding the axle hole.

Further, the stator iron core comprises a plurality of silicon steel laminations, the silicon steel laminations each having two opposite surfaces that are respectively formed with a recess and a projection, wherein for two adjacent ones of the silicon steel laminations, the projection of one of the silicon steel laminations being fit into and in engagement with the recess of another one of the silicon steel laminations, so as to connect the two adjacent silicon steel laminations.

The present invention also provides an electric motor, which comprises the electric motor stator that is described above and a rotor that is rotatably inserted into the electric motor stator.

In some embodiments, the rotor comprises a rotor core, a plurality of magnets fixed on the iron core, and a rotor casing fit over the iron core and the magnets.

In some embodiments, the rotor core is formed with a plurality of troughs, and the magnets are fit into and retained in the troughs respectively.

In some embodiments, the iron core is provided with bosses located between adjacent troughs for holding the magnets.

In some embodiments, the bosses are T-shaped.

In some embodiments, the rotor casing comprises an axial stop part and a folded flange that is opposite to the axial stop part, and a protective cover is interposed and fixed between the folded flange and the rotor core.

In some embodiments, the protective cover comprises a mounting section and a protective section extending outward from the mounting section in a radial direction of the rotor, and the magnet has an axial end that extends, in an axial direction of the rotor, beyond an axial end of the rotor core to abut the protective section.

In some embodiments, the protective cover is made of plastic or metal.

In some embodiments, the rotor casing is made of stainless steel.

Compared to the prior art, the electric motor according to the present invention is such that positioning grooves are formed in an external circumferential surface of a stator yoke for fitting to positioning posts provided in an end cap for positioning, and the positioning grooves are set in alignment with stator teeth in a radial direction, so that a width of the stator yoke in a radial direction can be compensated by the stator teeth for the portions corresponding to the positioning grooves, and for the entirety of the stator yoke, the width in the radial direction is almost not affected by the positioning grooves. The structure of the entirety is simple; the manufacturing is easy; and the magnetic reluctance of the electric motor is reduced, and the performance is good.

DETAILED DESCRIPTION OF PREFERRED EMBODIMENTS OF THE INVENTION

For better understanding of the present invention, the following provides a more complete description of the present invention with reference to related drawings. The drawings provide, as illustrative examples, one or more embodiments for more precisely and more actually understanding the technical solution disclosed in the present invention. However, it is appreciated that the present invention can be embodied in various forms and is not limited to the embodiments described below.

Identical or similar reference signs shown in the attached drawings of the present invention refer to identical or similar parts. In the description of the present invention, it is noted that terms, such as "up", "down", "left", and "right", which are used to indicate a directional or positional relationship refer to a directional or positional relationship illustrated in the attached drawings for the purpose of solely for easy description of the present invention and simplifying the illustration, and are not indicating or suggesting an illustrated device or component must take a specific direction or be constructed and operated according to a specific direction. Thus, the terms that are used to describe the positional relationship in the drawings are only used for illustrative purposes and should not be construed as constraining to the patent. For those having ordinary skill in the art, the meaning of such terms can be understood according to specific context.

Figure 10:
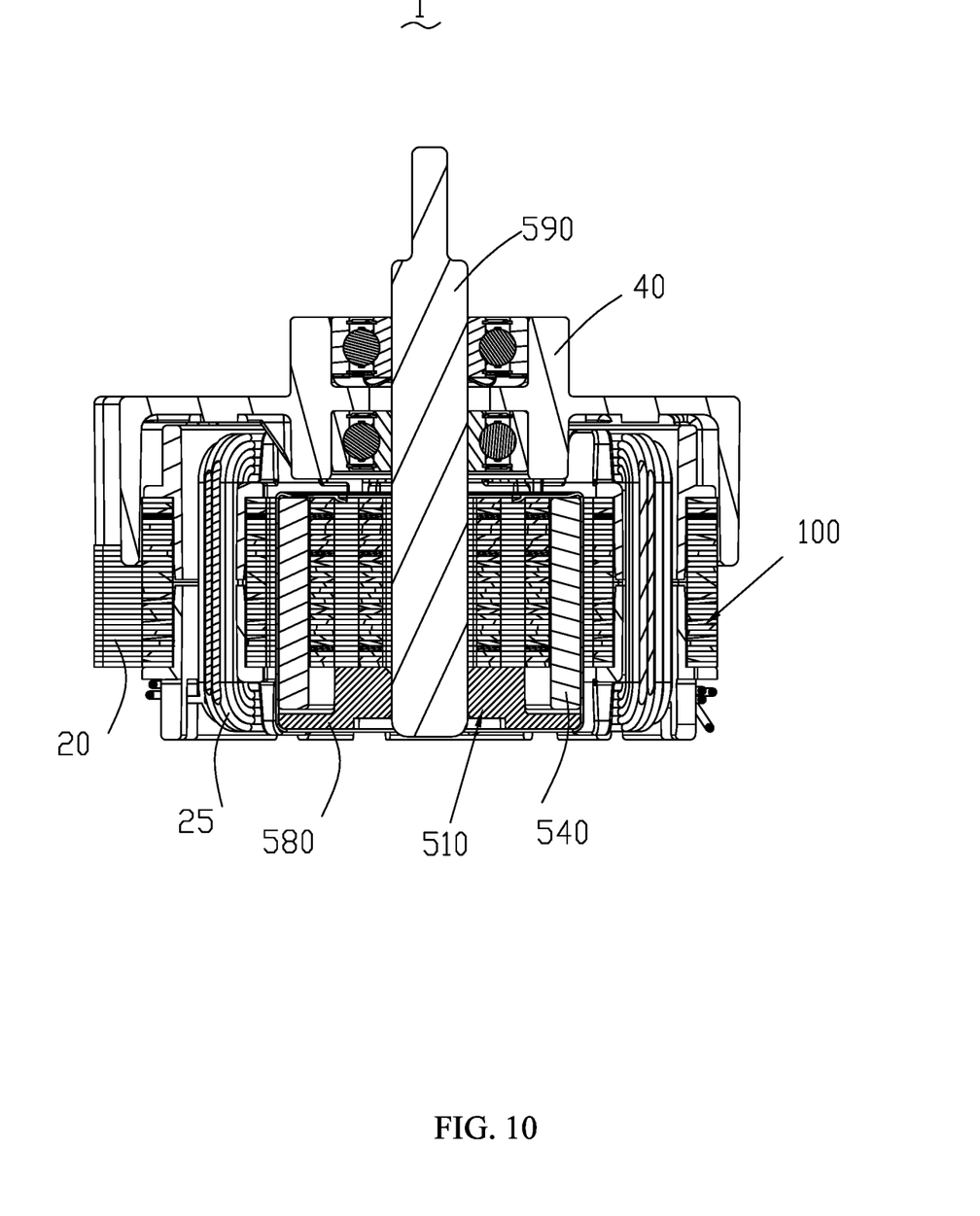
FIG. 10 is an axial cross-sectional view of an electric motor according to an embodiment of the present invention.

The present invention provides an electric motor 1 (shown in FIG. 10), which comprises a stator 100 and a rotor 510 that are relatively rotatable. Preferably, the motor is a brushless electric motor.

Figure 1:
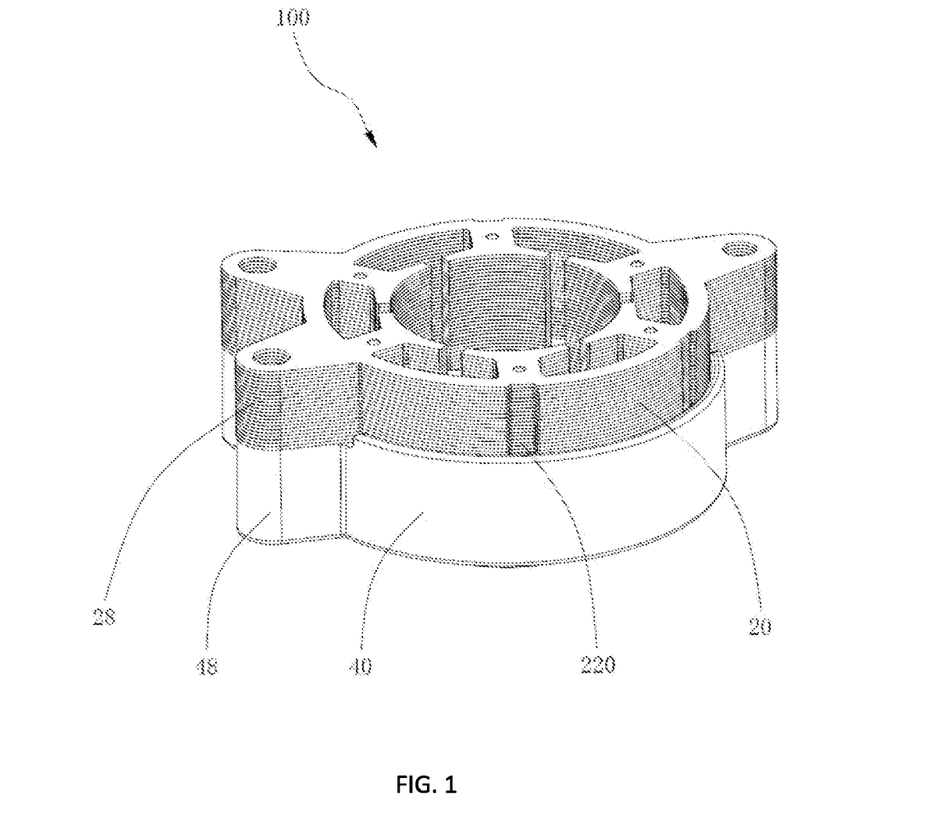
FIG. 1 is a schematic structural view illustrating an embodiment of an electric motor stator according to the present invention.
Figure 2:
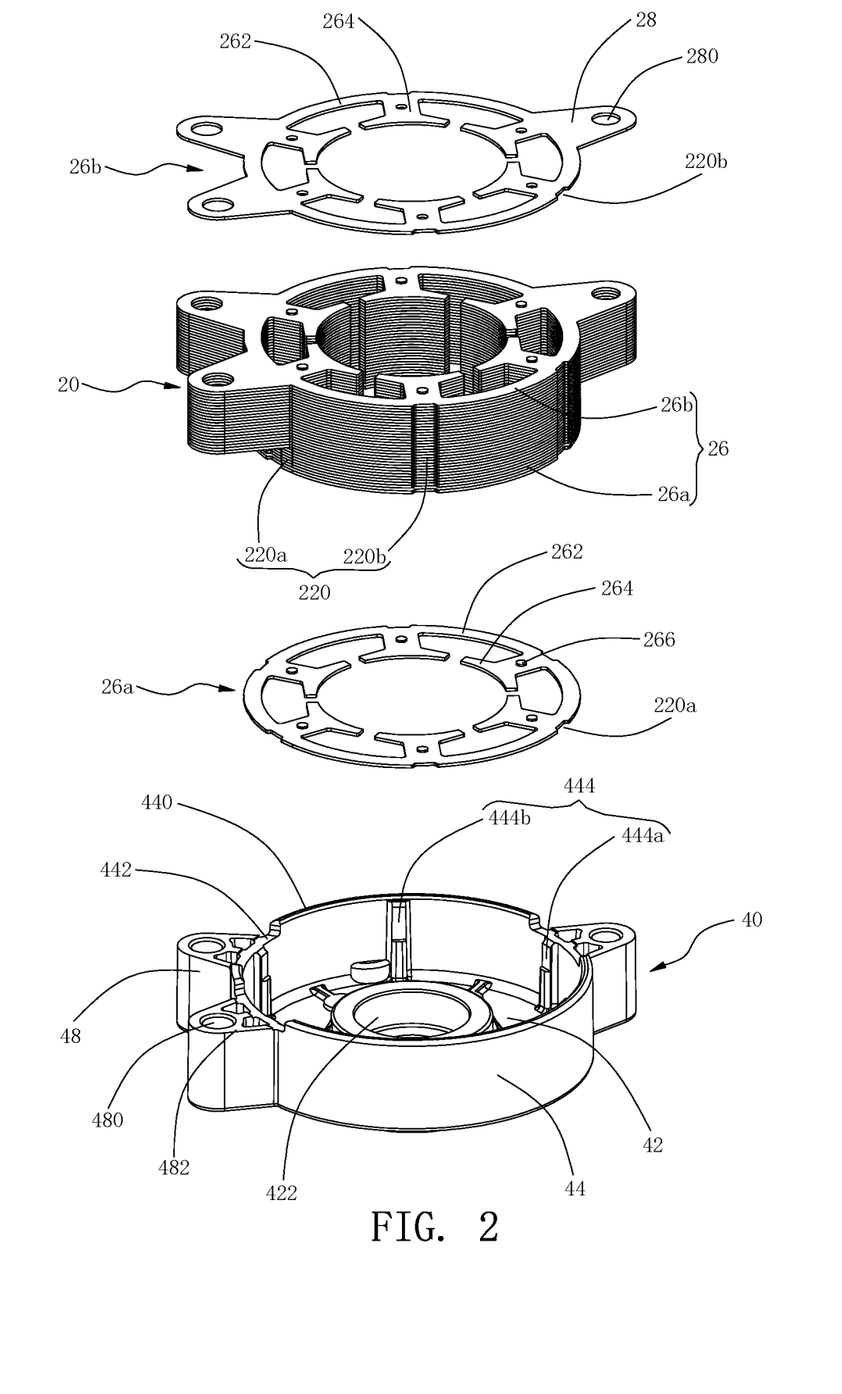
FIG. 2 is an exploded view of the electric motor stator shown in FIG. 1.
Figure 3:
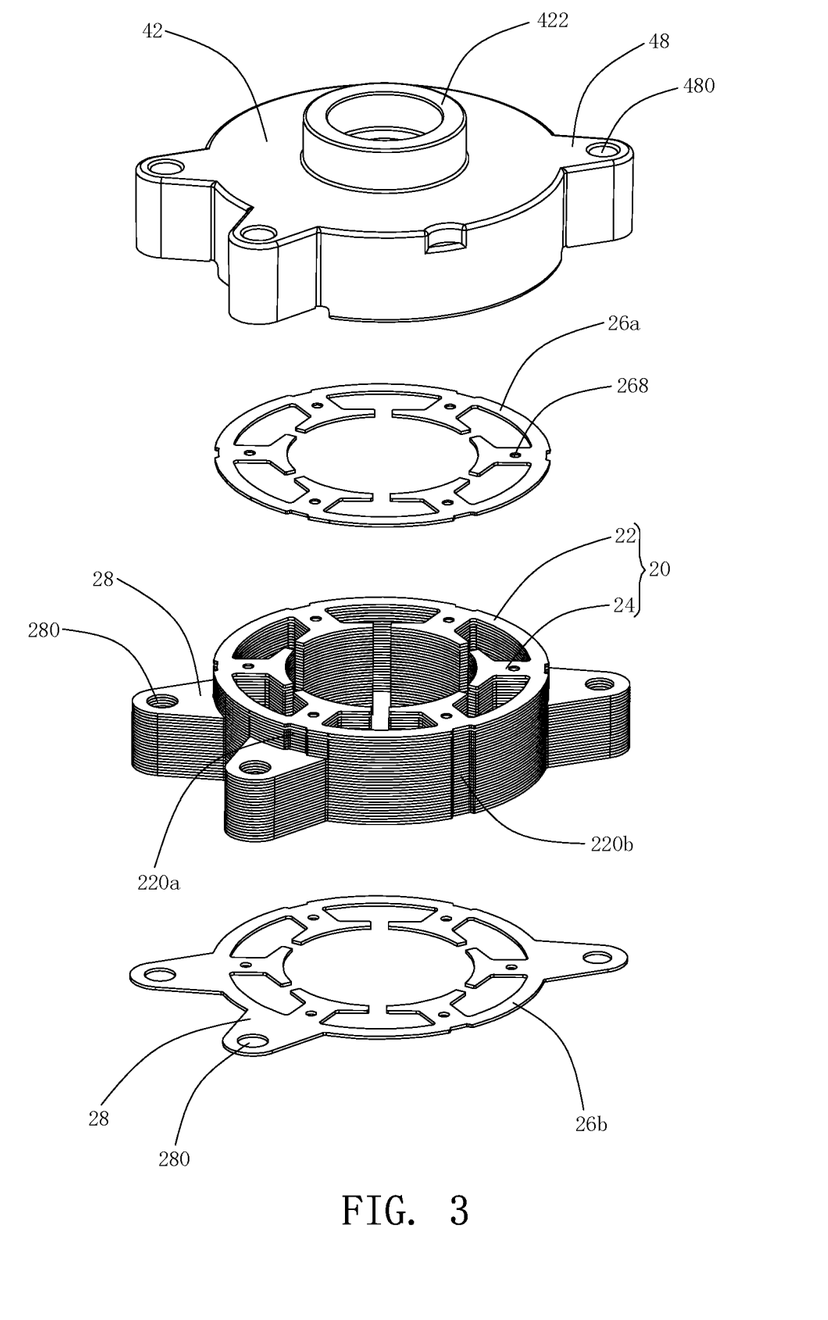
FIG. 3 is a view taken from a different angle of FIG. 2.
Figure 4:
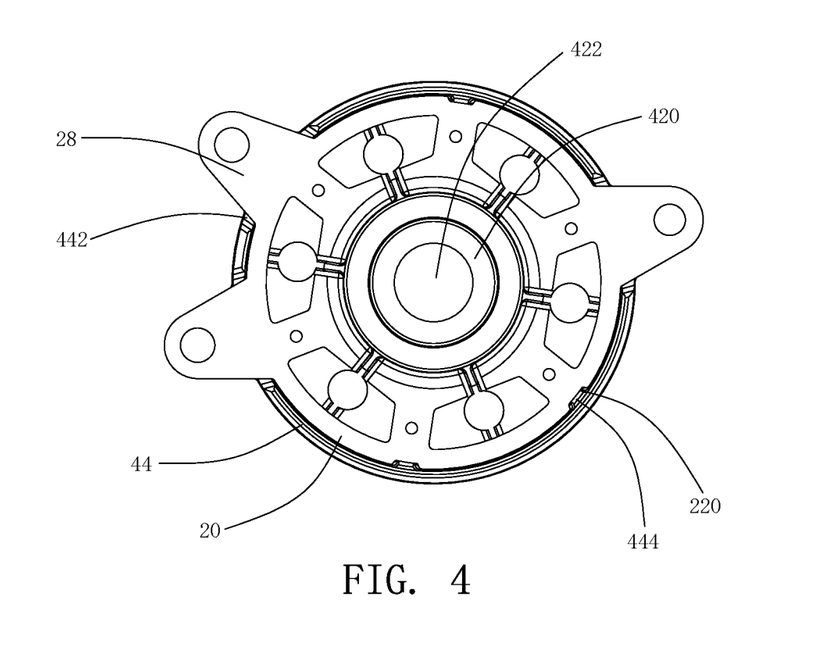
FIG. 4 is a top plan view of the electric motor stator shown in FIG. 1.
Figure 6:
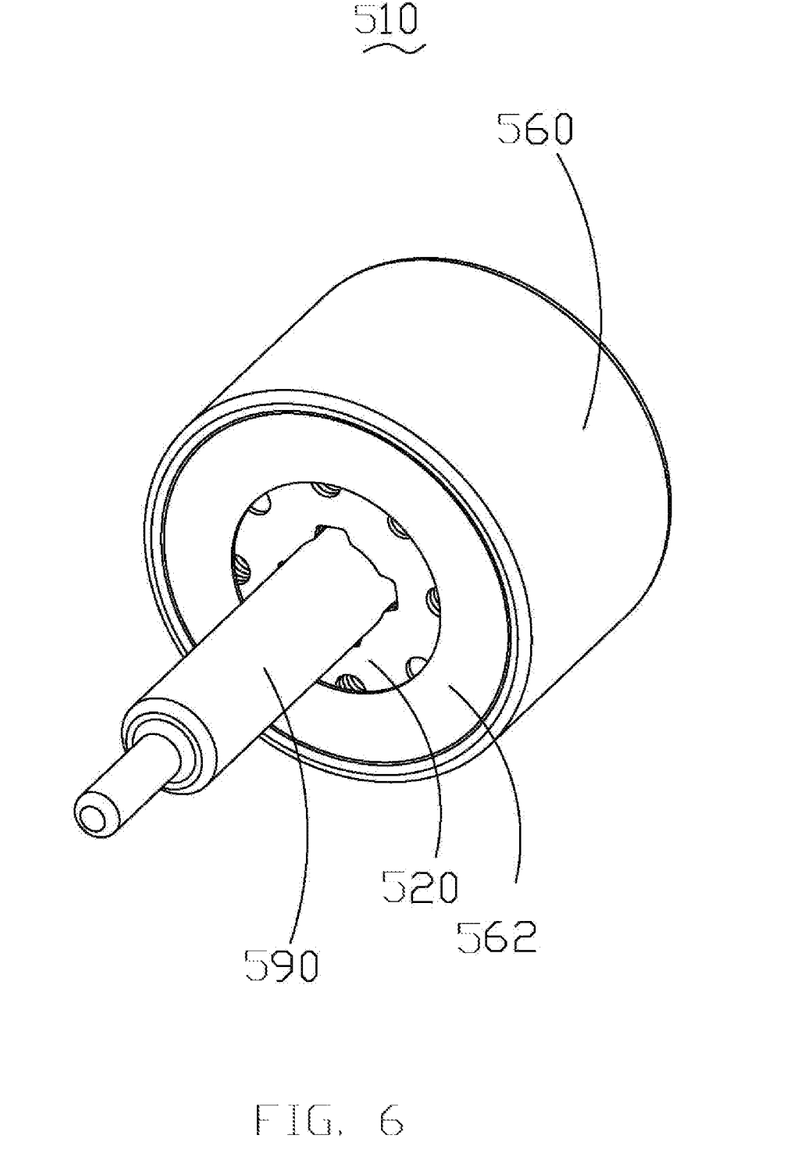
FIG. 6 is a perspective view illustrating an electric motor rotor according to the embodiment of the application.
Figure 7:
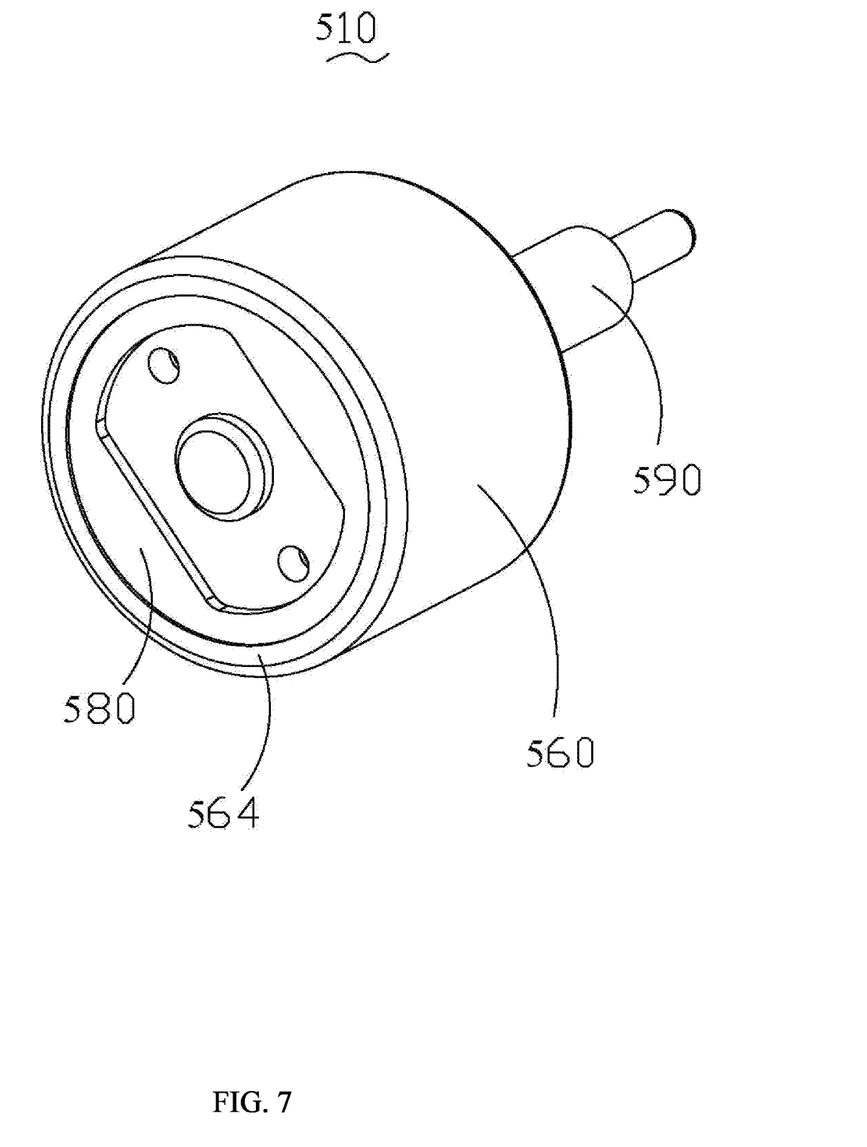
FIG. 7 is a view of the electric motor rotor of FIG. 6 taken from a different angle.

As shown in FIGS. 1-3, according to an embodiment of the present invention, an electric motor stator 100 comprises a stator iron core 20 and an end cap 40 for mounting the stator iron core 20. The end cap 40 serves as a part of a housing of the electric motor for mounting internal components of the electric motor and connecting the electric motor to an external device. The stator iron core 20 comprises a stator yoke 22 in an annular form and a plurality of stator teeth 24 extending inwards in a radial direction from an internal surface of the stator yoke 22, a coil 25 (shown in FIG. 10) being wound around each of the stator teeth 24. The stator teeth 24 are uniformly arranged in a circumferential direction of the stator yoke 22 at fixed intervals to jointly define a cylindrical space in which a rotor 510 (FIG. 6) can be received. When the electric motor is started up, the coils are fed with electricity to generate magnetic fields for polarizing the stator teeth 24 to interact with a magnetic field of the rotor 510 of the electric motor to drive the rotor 510 to rotate.

An external circumferential surface of the stator yoke 22 is inwardly recessed to form a plurality of positioning grooves 220, which cooperate with the end cap 40 for positioning. Each of the positioning grooves 220 is in alignment with one of the stator teeth 24 in a radial direction, and a depth of the positioning grooves 220 in the radial direction is far less than a width of the stator yoke 22 in the radial direction. The stator yoke 22, in the entirety thereof, can be of a complete annular structure. Arranging the positioning grooves 220 at positions that are in alignment with the stator teeth 24 make it possible to use the stator teeth 24 to compensate the influence of the positioning grooves 220 on the width of the stator yoke 22 in the radial direction, so that an increase of magnetic reluctance, which affects the performance of the electric motor, induced by the arrangement of the positioning grooves 220 can be avoided. Preferably, the number of the positioning grooves 220 corresponds to the number of the stator teeth 24, and the positioning grooves 220 and the stator teeth 24 correspond to each other, in a one to one manner, in the radial direction. It is appreciated that the positioning grooves 220 function for cooperating with the end cap 40 for positioning, and the number thereof can be less than the number of the stator teeth 24 or can even be just one.

The stator iron core 20 is formed of a plurality of silicon steel laminations/laminations 26 stacked on each other, and each of the silicon steel laminations 26 comprises a yoke part 262 in an annular form and a plurality of tooth part 264 formed on an inner side of the yoke part 262. The yoke part 262 of each of the silicon steel laminations 26 is stacked together to form the stator yoke 22, and correspondingly, the tooth parts 264 are stacked together to form the stator teeth 24. In the instant embodiment, the silicon steel laminations 26 comprise a plurality of first silicon steel laminations 26a and a plurality of second silicon steel laminations 26b, wherein the number of the second silicon steel laminations 26b is greater than that of the first silicon steel laminations 26a. The first silicon steel laminations 26a and the second silicon steel laminations 26b have the same main body structure, both comprising a stator yoke part 262 and a tooth part 264. A difference is that the yoke part 262 of the second silicon steel lamination 26b has an external circumferential surface that is protruded outward in the radial direction to form a plurality of connecting parts 28. Each of the connecting parts 28 is formed with a penetrating connection hole 280 for connecting and fixing the stator iron core 20 and the end cap 40. In other embodiments, the number of the first silicon steel laminations 26a and that of the second silicon steel laminations 26b can be identical, or alternatively, the number of the first silicon steel laminations 26a is greater than that of the second silicon steel laminations 26b.

The connecting parts 28 are arranged in the circumferential direction of the second silicon steel lamination 26b and spaced from each other in the circumferential direction. Each of the connecting parts 28 is in alignment with one of the tooth parts 264 in the radial direction, and correspondingly, the yoke part 262 of the second silicon steel lamination 26b is not provided with positioning grooves 220 where the connecting parts 28 are arranged. With the number of the tooth parts 264 and thus the stator teeth 24 being defined as N and the number of the connecting parts 28 being defined as M, it is preferred that the number of the stator teeth 24 is greater than the number of the connecting parts 28, namely N≥M. The number of the stator teeth 24 is preferably 3×, such as six (6) in the embodiment illustrated in the drawings, in order to construct a three-phase electric motor. In other embodiments, the number of the stator teeth 24 can be eight or ten, and is not limited to the examples of the embodiments. The number of the connecting parts 28 is preferably 3, in order to achieve stabilized triangular fixing. In the embodiment illustrated in the drawings, the connecting parts 28 are not arranged in a uniform manner in the circumferential direction. In other embodiments, the number and location of the connecting parts 28 can be modified according to requirements for assembling; and the connecting parts 28 can be arranged staggered with respect to the tooth parts 264 in the circumferential direction, in order to prevent influence on the arrangement of the positioning grooves 220.

In the instant embodiment, the positioning grooves 220 comprise first positioning grooves 220a and second positioning grooves 220b. In this arrangement, the first positioning grooves 220a are arranged to align with the connecting parts 28 in the axial direction, and due to the arrangement of the connecting parts 28, an extension range of the first positioning grooves 220a is limited to the first silicon steel laminations 26a only, and a height thereof in the axial direction is less than the stator iron core 20; and the second positioning grooves 220b are arranged to stagger with respect to the connecting parts 28 in the circumferential direction, and an extension range thereof covers each of the first silicon steel laminations 26a and the second silicon steel laminations 26b, meaning the second positioning grooves 220b extend completely through the entirety of the stator iron core 20 in the axial direction. Correspondingly, the total number of the positioning grooves 220 is N, and is identical to the number of the stator teeth 24; the number of the first positioning grooves 220a is M, and is identical to the number of the connecting parts 28, and the number of the second positioning grooves 220b is N-M. In the embodiment illustrated in the drawings, the numbers of the first positioning grooves 220a and the second positioning grooves 220b are each 3. In case that the connecting parts 28 and the tooth parts 264 are staggered with respect to each other, each of the positioning grooves 220 may have a structure that is different from or identical to that of the other ones, and may extend completely through the entirety of the stator iron core 20 in the axial direction, or may alternatively be only formed in the first silicon steel laminations 26a.

Preferably, each of the silicon steel laminations 26 is raised from one surface thereof to form projections 266, while an opposite surface is inwardly notched to form recesses 268 at locations corresponding to the projections 266. The projections 266 and the recesses 268 can be formed in one single forming operation by stamping. Each of the silicon steel laminations 26 is stacked together, and the projections 266 of each of the silicon steel laminations 26 are correspondingly fit into and in engagement with the recesses 268 of another one of the silicon steel laminations 26 that is adjacent thereto, so that by means of the projection-recess engagement, the silicon steel laminations 26 are connected together as a unitary structure to form the stator iron core 20. In the embodiment illustrated in the drawings, the silicon steel lamination 26 is formed, in each of the tooth parts 264 thereof, with the projection 266 and the recess 268, so that each of the tooth parts 264 can be connected to ensure the stability and uniform action of force applied thereto after the stator iron core 20 has been mounted. It is appreciated that, in the stator iron core 20, each of the silicon steel laminations 26 can be interconnected with each other by other measures, such as interconnection of snap fitting.

Figure 5:
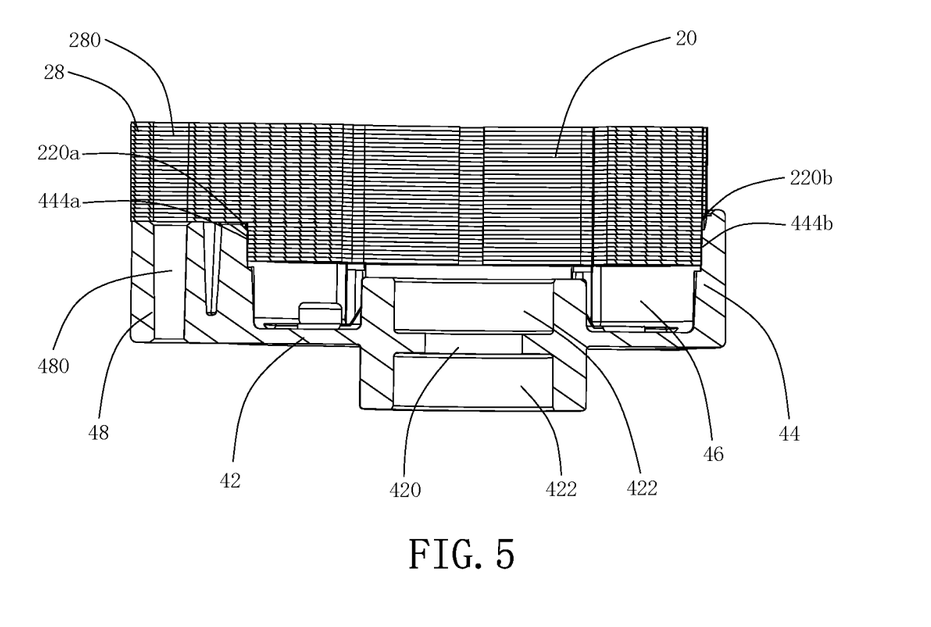
FIG. 5 is a cross-sectional view of the electric motor stator shown in FIG. 1.

The end cap 40 is of a cylindrical structure having one closed end and one open end and comprises a bottom plate 42 and an annular side plate 44 extending perpendicularly from an outer edge of the bottom plate 42. The bottom plate 42 and the side plate 44 jointly define a receiving space 46. In assembling, one end of the stator iron core 20 on which the first silicon steel laminations 26a are located is set toward the open end of the end cap 40 and is introduced through the open end into the receiving space 46 of the end cap 40. A central portion of the bottom plate 42 is formed through an axle hole 420 to receive extension of a rotary axle of the rotor 510 therethrough for driving a load. Around the axle hole 420, the central portion of the bottom plate 42 is also formed with a bearing seat 422 for mounting a bearing to support a rotating motion of the rotary axle. In the embodiment illustrated in the drawings, the rotor can adopt a cantilever arm structure, and each of an internal side and an external side of the bottom plate 42 is provided with one such bearing seat 422, so that two such bearings are mounted, at intervals, at the same end of the rotor to form a supporting structure for reducing the oscillation of the rotor and for reducing occurrence of noise.

Corresponding to the connecting parts 28 of the stator iron core 20, an external surface of the side plate 44 is protruded to form a plurality of mounting portions 48, and each of the mounting portions 48 is formed with a mounting hole 480. In the embodiment illustrated in the drawings, the mounting portion 48 has an end surface 482 that is slightly lower than an end surface 440 of the side plate 44, and the side plate 44 is formed, in an outer end thereof, with an opening 442 at a location corresponding to each of the mounting portions 48. The number of the mounting portions 48 and the opening 442 is identical to that of the connecting parts 28, both being M. Preferably, the opening 442 extends in the radial direction completely through the side plate 44, and a bottom of the opening 442 is not higher than the end surface 482 of the mounting portion 48. As such, to introduce the stator iron core 20 into the end cap 40, the connecting parts 28 may extend through the openings 442 of the side plate 44 to outside of the end cap 40 to position on the end surfaces 482 of the mounting portions 48. Cooperation of the openings 442 and the connecting parts 28 facilitates to position the stator iron core 20 relative to the end cap 40 in the circumferential direction. The connection holes 280 of the connecting parts 28 are in alignment with and in communication with the mounting holes 480 of the mounting portions 48, so that fasteners, such as bolts, may easily connect and fix the electric motor of the present invention to other devices.

Corresponding to the positioning grooves 220 of the stator iron core 20, an internal surface of the side plate 44 is protruded to form positioning posts/ribs 444. Each of the positioning posts 444 is fit to and connected with one of the positioning grooves 220 so as to realize positioning of the stator iron core 20 and the end cap 40 in the circumferential direction. In the instant embodiment, the positioning posts 444 comprise first positioning posts 444a and second positioning posts 444b. The first positioning posts 444a are for fitting into and connecting with the first positioning grooves 220a, and the number thereof is M; the second positioning posts 444b are for fitting into and connecting with the second positioning grooves 220b, and the number thereof is N-M. The first positioning posts 444a are arranged to align with the openings 442 in the axial direction and have a top end that is not higher than the end surface 482 of the mounting portions 48; the second positioning posts 444b are arranged to stagger with respect to the openings 442 in the circumferential direction and have a top end that is generally flush with the end surface 440 of the side plate 44. In other words, a height of the first positioning posts 444a in the axial direction is less than a height of the second positioning posts 444b in the axial direction. In case that connecting parts 28 and the tooth parts 264 are staggered with respect to each other, the positioning posts 444 are staggered with respect to the openings 442 extending through the connecting parts 28. Under this condition, each of the positioning posts 444 may be of a structure that is identical or different.

To assemble the stator iron core 20 to the end cap 40, the connecting parts 28 are set in alignment with the mounting portions 48 respectively, and at the same time, each of the first positioning posts 444a is made in alignment with one of the first positioning grooves 220a and each of the second positioning posts 444b in alignment with one of the second positioning grooves 220b. During the course of introducing the stator iron core 20 into the end cap 40, the second positioning posts 444b are first inserted into the second positioning grooves 220b corresponding thereto, and then, the first positioning posts 444a are inserted into the first positioning grooves 220a corresponding thereto. Due to the arrangement of the openings 442 in the side plate 44, in assembling of the stator iron core 20, the first silicon steel laminations 26a and a portion of the second silicon steel laminations 26b thereof are positioned into the end cap 40, while a portion of the second silicon steel laminations 26b is exposed outside the end cap 40, and the first positioning posts 444a are inserted into the first positioning grooves 220a to interact with the first silicon steel laminations 26a, and the second positioning posts 444b are inserted into the second positioning grooves 220b to interact with the first silicon steel laminations 26a and a portion of the second silicon steel laminations 26b, so that the stator iron core 20 is positioned in the circumferential direction.

The electric motor according to the present invention and the electric motor stator 5100 thereof are such that the external circumferential surface of the stator yoke 22 of the stator iron core 20 is formed, in positions corresponding to the stator teeth 24, the positioning grooves 220, and the end cap 40 is provided with the positioning posts 444 that are insertable into and connectable with the positioning grooves 220, and thus, while the stator iron core 20 can be positioned, it is also ensured the arrangement of the positioning grooves 220 does not cause an increase of magnetic reluctance to thereby maintain the performance of the electric motor. Further, positioning a portion of the stator iron core 20 in the end cap 40 could effectively reduce an overall height of the electric motor in the axial direction and reduce the size of the electric motor. Also, the stator iron core 20 and the end cap 40 are respectively provided with the connecting parts 28 and the mounting portions 48, so as to ease connection of the electric motor with other devices; and corresponding to the arrangement of the connecting parts 28 and the mounting portions 48, the positioning grooves 220 and the positioning posts 444 are made to each include two different types of different lengths in order to ensure the consistency of the combination of the stator iron core 20 and the end cap 40, and ensure stable operation of the rotor after the assembling of the rotor, and guarantee operation safety and effectiveness of the electric motor.

FIGS. 6-9 illustrate a rotor 510 of the electric motor according to another embodiment of the present invention. The rotor 510 is rotatably received in the stator 100. Referring to FIGS. 6-9, the rotor 510 comprises a rotor iron core 520, a plurality of magnets 540 fixed on the rotor iron core 520, and a rotor casing 560 fit over the iron core 520 and the magnets 540. The rotor iron core 520 is formed with a plurality of troughs 522, and the magnets 540 are fit into and retained in the troughs 522. The rotor casing 560 is sleeved on an outer circumference of the iron core 520 and the magnets 540. The rotor casing 560 comprises an axial stop part 562. The electric motor rotor 510 further comprises a protective cover 580. The protective cover 580 and the axial stop part 562 of the rotor casing 560 are respectively at two ends of the magnets 540 in the axial direction to fix the magnets 540 therebetween.

Figure 8:
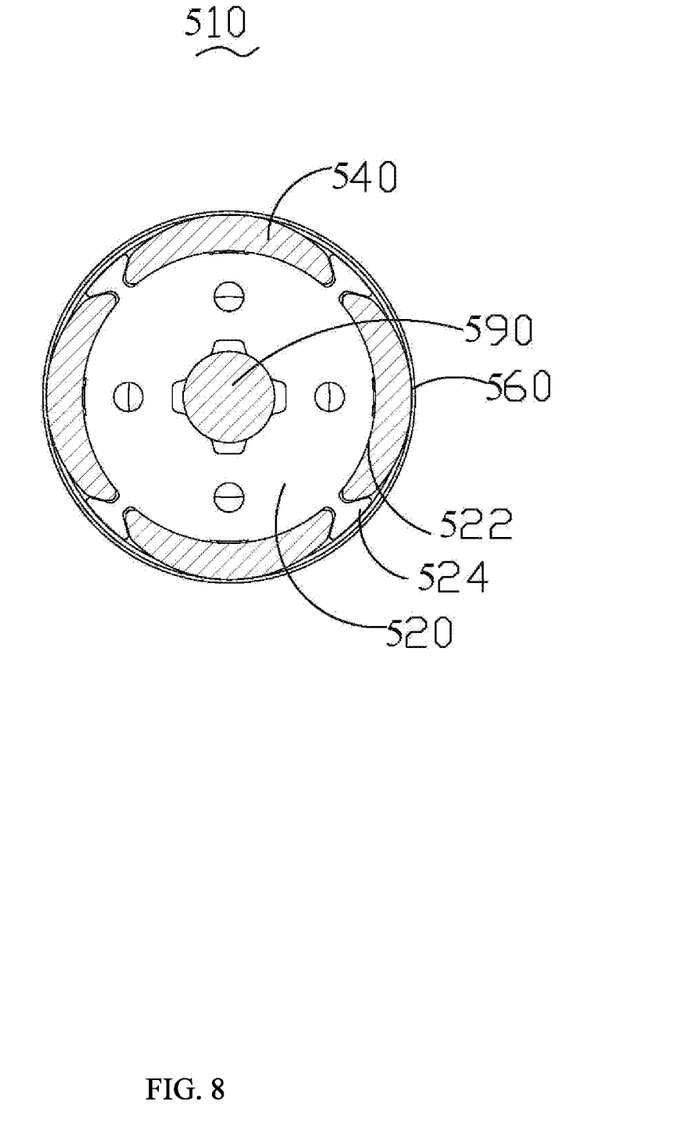
FIG. 8 is a radial cross-sectional view of the electric motor rotor of FIG. 6.

In some embodiments, the troughs 522 are formed in an outside surface of the iron core 520, and the iron core 520 is provided with bosses 524 located between adjacent ones of the troughs 522 for holding the magnets 540. The bosses 524 are preferably T-shaped. The trough 522 has a width that extends in the circumferential direction and is gradually reduced inwardly in the radial direction of the iron core 520. The boss 524 has a width that extends in the circumferential direction and is gradually increased outwardly in the radial direction of the iron core 520 to form a dove-tailed configuration.

Figure 9:
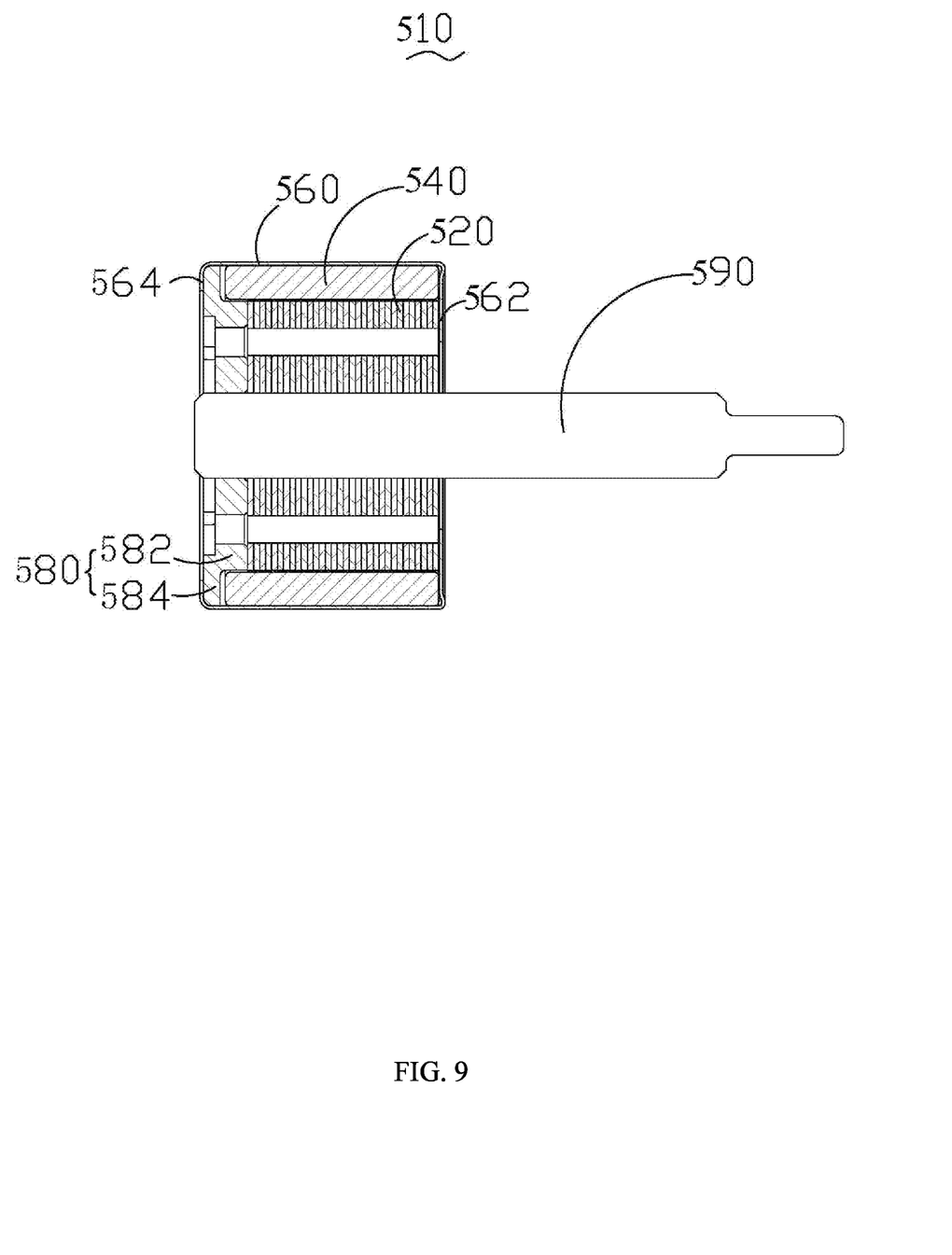
FIG. 9 is an axial cross-sectional view of the electric motor rotor of FIG. 6.

In some embodiments, the rotor casing 560 further comprises a folded flange 564 that is opposite to the axial stop part 562, and the protective cover 580 is interposed and fixed between the folded flange 564 and the iron core 520.

In some embodiments, the protective cover 580 comprises a mounting section 582 and a protective section 584 extending outward from the mounting section 582 in the radial direction of the iron core 520. The magnet 540 has an axial end that extends, in the axial direction, beyond an axial end of the iron core 520 to abut the protective section 584.

In some embodiments, the electric motor rotor 510 further comprises a rotary axle 590 that penetrates through the iron core 520 and the protective cover 580. The iron core 520 and the mounting section 582 of the protective cover 580 are mounted to the rotary axle 590 to be rotatable in unison with the rotary axle 590. Preferably, force fitting is established between the protective cover 580 and the rotary axle 590.

In some embodiments, the rotor casing 560 further comprises a main body portion that surrounds an outer circumference of the magnets 540. The axial stop part 562 and the folded flange 564 are extended inwardly from two axial ends of the main body portion in the radial direction of the rotor as being integrally formed therewith, with the axial stop part 562 abutting an end of the rotor iron core 520 in the axial direction. Specifically, the rotor casing 560, after being formed, shows a cylindrical shape having one end formed with the axial stop part 562 and an opposite end forming an opening in a straight configuration, so that the rotor iron core 520 and the magnets 540 can be disposed, through the opening of a straight configuration, into the main body portion of the rotor casing 560, and then the straight opening of the rotor casing 560 is subjected to outward folding to form the folded flange 64. The folded flange 64 presses against an outside of the protective end of the protective cover 580.

In some embodiments, the rotor casing 560 is made of stainless steel.

In some embodiments, the protective cover 580 is made of a plastic material or a metal (such as aluminum and copper). The protective cover 580 separates the magnets 540 from the folded flange 564 of the rotor casing 560 to prevent the folded flange 564 of the rotor casing 560 from depressing the magnets 540 to cause damages.

In the above embodiment, the bosses 524 functions to position the magnets 540 in the circumferential direction, while the dove-tailed configuration of the bosses 524 also helps prevent the magnets 540 from being thrown out in the radial direction. The main body portion of the rotor casing 560 functions to position the magnets 540 in the radial direction and prevents the magnets 540, after disintegrating, from flying out in the radial direction. The protective cover 80 and the axial stop part 562 of the rotor casing 560 jointly position the magnets 540 in the axial direction.

It is noted that the present invention is not limited to the embodiments provided above. Based on the spirit of innovation of the present invention, skilled artisans in the technical field may contemplate other modifications, and such modifications that are made in accordance with the spirit of innovation of the present invention should be included in the scope of protection that the present invention pursues.

What is claimed is:

1. An electric motor stator, comprising:
   a stator iron core comprising a stator yoke in an annular form and a plurality of stator teeth extending inwards in a radial direction from an internal circumferential surface of the stator yoke; and
   an end cap, the end cap having formed, in an interior thereof, a receiving space that receives the stator iron core therein,
   wherein the stator yoke has an external circumferential surface that is inwardly recessed to form at least one positioning groove, and the end cap has an internal surface provided with at least one positioning post protruding therefrom;
   each of the at least one positioning post is insertable into and connectable with one of the at least one positioning groove; and
   in the radial direction of the stator iron core, each of the at least one positioning groove corresponds to one of the stator teeth,
   wherein the stator iron core comprises a plurality of first laminations and a plurality of second laminations, the first laminations being received in the receiving space of the end cap, the second laminations having an external circumferential surface that is outwardly protruded in the radial direction to form connecting parts, the connecting parts extending outside of the end cap; and
   the at least one positioning groove comprises multiple positioning grooves which comprise first positioning grooves and second positioning grooves, the first positioning grooves being formed in the external circumferential surface of the first laminations and in alignment with the connecting parts in an axial direction, the second positioning grooves being formed in the external circumferential surface of the first laminations and the second laminations and being staggered with respect to the connecting parts in a circumferential direction.

2. The electric motor stator according to claim 1, wherein the positioning grooves correspond, in number, to the stator teeth; and in the radial direction of the stator iron core, the positioning grooves correspond to the stator teeth in a one to one manner.

3. The electric motor stator according to claim 1, wherein the end cap comprises a bottom plate and a side plate circumferentially surrounding the bottom plate, the at least one positioning post comprising multiple positioning posts that are formed in on an internal surface of the side plate, the positioning posts comprising first positioning posts and second positioning posts, the first positioning posts being insertable into and connectable with the first positioning grooves, the second positioning posts being insertable into and connectable with the second positioning grooves, the first positioning posts having an axial length that is less than an axial length of the second positioning posts.

4. The electric motor stator according to claim 3, wherein the side plate is formed with openings in an end thereof that is distant from the bottom plate, each of the openings being in alignment with one of the first positioning posts in the axial direction, the openings extending through the side plate in the radial direction; a portion of the second laminations is located inside the end cap and a portion of the second laminations is located outside the end cap, the connecting parts of the second laminations extending through the openings to outside of the end cap.

5. The electric motor stator according to claim 4, wherein the side plate has an external surface that is protruded in a position corresponding to each of the openings to form a mounting portion, the mounting portions having an end surface that is not lower than a bottom surface of the openings, the connecting parts extending through the openings to stack on the mounting portions respectively.

6. The electric motor stator according to claim 5, wherein the connecting parts are each formed with a connection hole, the mounting portions being each formed with a mounting hole, the connecting holes being in alignment with and in communication with the mounting holes respectively.

7. The electric motor stator according to claim 3, wherein the bottom plate is formed, in a central portion thereof, with an axle hole, and the bottom plate is provided, on each of inner and outer sides thereof, with a bearing seat surrounding the axle hole.

8. The electric motor stator according to claim 1, wherein the stator iron core comprises a plurality of laminations each having two opposite surfaces that are respectively formed with a recess and a projection, wherein for two adjacent ones of the laminations, the projection of one of the laminations is fit into and in engagement with the recess of another one of the laminations, so as to connect the two adjacent laminations.

9. An electric motor, comprising:
a stator iron core comprising:
a stator yoke in an annular form and a plurality of stator teeth extending inwards in a radial direction from an internal circumferential surface of the stator yoke; and
an end cap, the end cap being formed, in an interior thereof, with a receiving space that receives the stator iron core therein; and
a rotor that is rotatably inserted into the stator,
wherein the stator yoke has an external circumferential surface that is inwardly recessed to form at least one positioning groove, and the end cap has an internal surface provided with at least one positioning post protruding therefrom;
each of the at least one positioning post is insertable into and connectable with one of the at least one positioning groove; and
in the radial direction of the stator iron core, each of the at least one positioning groove corresponds to one of the stator teeth,
wherein the rotor casing comprises an axial stop part and a folded flange that is opposite to the axial stop part, and a protective cover is interposed and fixed between the folded flange and the rotor core.

10. The electric motor according to claim 9, wherein the rotor comprises a rotor core, a plurality of magnets fixed on the rotor core, and a rotor casing fit over the iron core and the magnets.

11. The electric motor according to claim 10, wherein the rotor core is formed with a plurality of troughs, and the magnets are fit into and retained in the troughs respectively.

12. The electric motor according to claim 11, wherein the iron core is provided with bosses located between adjacent troughs for holding the magnets.

13. The electric motor according to claim 12, wherein the bosses are T-shaped.

14. The electric motor according to claim 10, wherein the protective cover comprises a mounting section and a protective section extending outward from the mounting section in a radial direction of the rotor, and the magnet has an axial end that extends, in an axial direction of the rotor, beyond an axial end of the rotor core to abut the protective section.

15. The electric motor according to claim 14, wherein the protective cover is made of plastic or metal.

16. The electric motor according to claim 10, wherein the rotor casing is made of stainless steel.

* * * * *